United States Patent
Rofougaran

(10) Patent No.: US 8,160,498 B2
(45) Date of Patent: Apr. 17, 2012

(54) METHOD AND SYSTEM FOR PORTABLE DATA STORAGE WITH INTEGRATED 60 GHZ RADIO

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 671 days.

(21) Appl. No.: 11/954,353

(22) Filed: Dec. 12, 2007

(65) Prior Publication Data

US 2009/0156120 A1 Jun. 18, 2009

(51) Int. Cl.
H04B 7/00 (2006.01)
H04B 1/00 (2006.01)

(52) U.S. Cl. .......................... 455/41.3; 455/41.2; 455/69

(58) Field of Classification Search ................ 455/39, 455/41.1, 41.2, 41.3, 67.11, 69, 77, 550.1, 455/101, 132, 193.1
See application file for complete search history.

(56) References Cited

U.S. PATENT DOCUMENTS

| | | | |
|---|---|---|---|
| 5,798,567 A | 8/1998 | Kelly et al. | |
| 6,060,433 A | 5/2000 | Li et al. | |
| 7,038,625 B1 | 5/2006 | Taylor et al. | |
| 7,099,678 B2 | 8/2006 | Vaidyanathan | |
| 7,138,884 B2 | 11/2006 | Cheung | |
| 7,247,932 B1 | 7/2007 | Lin et al. | |
| 7,260,424 B2 | 8/2007 | Schmidt | |
| 7,340,279 B2* | 3/2008 | Chen et al. | 455/562.1 |
| 7,363,017 B2* | 4/2008 | Miya et al. | 455/300 |
| 7,747,225 B2* | 6/2010 | Wang et al. | 455/69 |
| 7,808,429 B2* | 10/2010 | Curry et al. | 342/359 |
| 2002/0122004 A1 | 9/2002 | Richards et al. | |
| 2003/0095066 A1* | 5/2003 | Brogden | 342/372 |
| 2004/0041732 A1 | 3/2004 | Aikawa et al. | |
| 2004/0119648 A1* | 6/2004 | Ghosh et al. | 343/700 MS |
| 2004/0150554 A1 | 8/2004 | Stenger et al. | |
| 2004/0201526 A1 | 10/2004 | Knowles et al. | |
| 2004/0204103 A1* | 10/2004 | Rouphael | 455/562.1 |
| 2004/0222506 A1 | 11/2004 | Wei et al. | |
| 2005/0012675 A1 | 1/2005 | Sakiyama et al. | |

(Continued)

FOREIGN PATENT DOCUMENTS

CN 1716695 1/2006

(Continued)

OTHER PUBLICATIONS

European Search Report for European Patent Application No. 08020760.8-2220, mailed May 19, 2009.

*Primary Examiner* — Andrew Wendell
(74) *Attorney, Agent, or Firm* — Farjami & Farjami LLP

(57) ABSTRACT

Aspects of a method and system for portable data storage with an integrated 60 GHz radio may include establishing a microwave communication link between a wireless portable storage device and a wireless transmitter and/or wireless receiver. Beamforming parameters of a first antenna array coupled to said wireless portable storage device and a second antenna array coupled to said wireless transmitter and/or wireless receiver may be adjusted automatically and/or dynamically. The wireless portable storage and the wireless transmitter and/or wireless receiver may exchange data via said first antenna array and said second antenna array. A secondary wireless communication link may be established to initialize the establishing of the microwave communication link. The secondary wireless communication link may be established via Bluetooth protocol. The wireless portable storage and the wireless transmitter and/or wireless receiver may receive and transmit in the 60 GHz frequency band.

20 Claims, 4 Drawing Sheets

U.S. PATENT DOCUMENTS

| | | |
|---|---|---|
| 2005/0212642 A1 | 9/2005 | Pleskach et al. |
| 2005/0237237 A1 | 10/2005 | Lust et al. |
| 2006/0033671 A1 | 2/2006 | Chan et al. |
| 2006/0077102 A1 | 4/2006 | Mohamadi |
| 2006/0092079 A1 | 5/2006 | de Rochemont |
| 2006/0152911 A1 | 7/2006 | Humbert et al. |
| 2006/0214836 A1* | 9/2006 | Baharav et al. ............... 342/22 |
| 2006/0235958 A1* | 10/2006 | Motoyama ................ 709/223 |
| 2007/0010200 A1* | 1/2007 | Kaneko .................... 455/41.2 |
| 2007/0013051 A1 | 1/2007 | Heyan et al. |
| 2007/0205748 A1 | 9/2007 | Abou |
| 2007/0207730 A1* | 9/2007 | Nguyen et al. ............... 455/39 |
| 2008/0045189 A1* | 2/2008 | Kim et al. ................ 455/414.2 |
| 2008/0178241 A1* | 7/2008 | Gilboy ...................... 725/114 |
| 2008/0291115 A1 | 11/2008 | Doan et al. |
| 2009/0153421 A1 | 6/2009 | Rofougaran et al. |
| 2009/0153427 A1 | 6/2009 | Rofougaran |
| 2009/0153428 A1 | 6/2009 | Rofougaran et al. |
| 2009/0179814 A1 | 7/2009 | Park et al. |
| 2009/0189064 A1 | 7/2009 | Miller et al. |
| 2009/0221313 A1* | 9/2009 | Rofougaran ................ 455/500 |
| 2009/0239479 A1* | 9/2009 | Doi .............................. 455/69 |
| 2010/0090902 A1 | 4/2010 | Thompson et al. |

FOREIGN PATENT DOCUMENTS

| | | |
|---|---|---|
| EP | 1 146 592 | 10/2001 |
| KR | 20050065395 | 6/2005 |
| KR | 20060087503 | 8/2006 |
| WO | WO9621255 A1 | 7/1996 |
| WO | WO 2007/114620 | 10/2007 |

* cited by examiner

METHOD AND SYSTEM FOR PORTABLE DATA STORAGE WITH INTEGRATED 60 GHZ RADIO

CROSS-REFERENCE TO RELATED APPLICATIONS/INCORPORATION BY REFERENCE

Not applicable.

FIELD OF THE INVENTION

Certain embodiments of the invention relate to signal processing for communication systems. More specifically, certain embodiments of the invention relate to a method and system for portable data storage with integrated 60 GHz radio.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

Currently, there are many different communication technologies and protocols, some of which may utilize common data formats and while others may utilize different data formats. Today's mobile communication devices have to support these man different communication technologies, protocols and/or data formats.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for portable data storage with an integrated 60 GHz radio, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for portable data storage with an integrated 60 GHz radio. Aspects of a method and system for portable data storage with integrated 60 GHz radio may comprise establishing a microwave communication link between a wireless portable storage device and a wireless transmitter and/or wireless receiver. Beamforming parameters of a first antenna array coupled to said wireless portable storage device and a second antenna array coupled to said wireless transmitter and/or wireless receiver may be adjusted automatically and/or dynamically. The wireless portable storage and the wireless transmitter and/or wireless receiver may exchange data via said first antenna array and said second antenna array.

A secondary wireless communication link may be established to initialize the establishing of the microwave communication link. The secondary wireless communication link may be established via a Bluetooth protocol. The wireless portable storage and the wireless transmitter and/or wireless receiver may receive and transmit in the 60 GHz frequency band. The first antenna array and/or the second antenna array may be located on a casing, within an integrated circuit package, or within an integrated circuit of said wireless portable storage. The wireless portable storage and/or the wireless transmitter and/or receiver may be located within a laptop, a personal computer, a mobile telephone, a Personal Digital Assistant (PDA), a set-top box, and a multi-media device. The first antenna array and the second antenna array may comprise one or more antennas, and the beamforming parameters may be adjusted to optimize a communication link performance metric.

Figure 1:
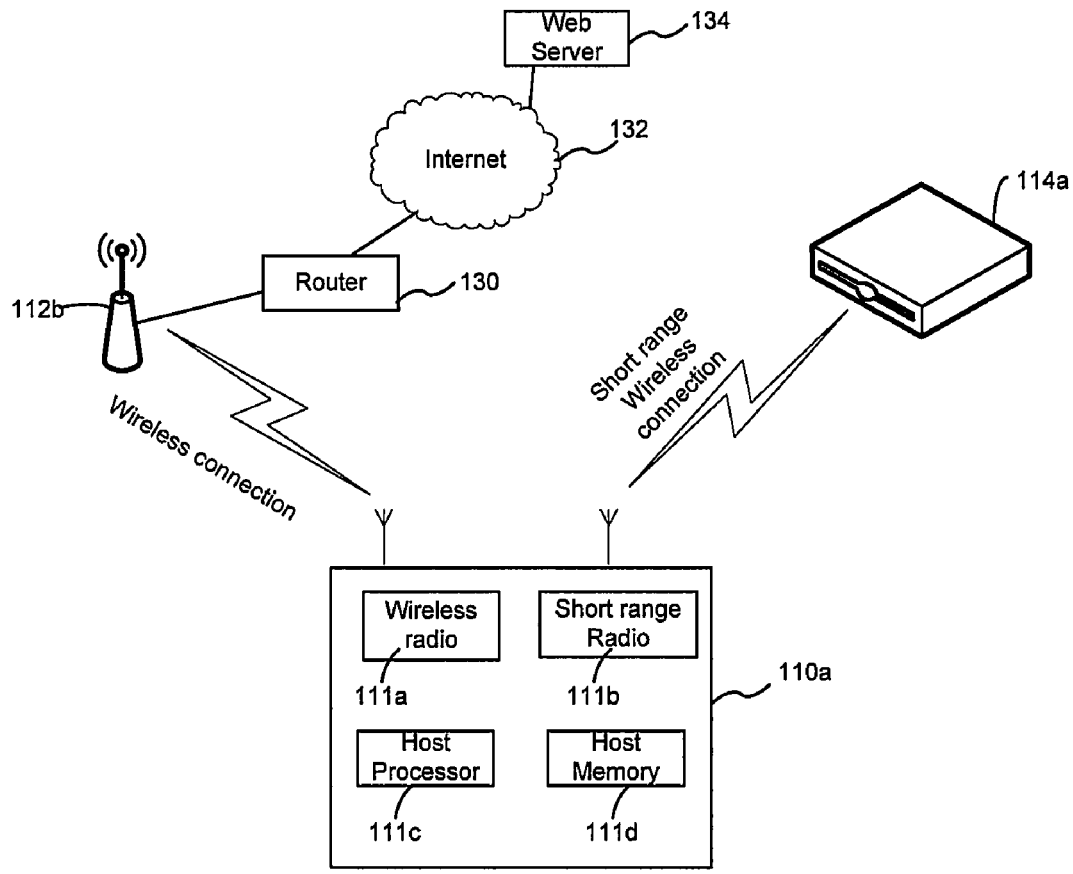
FIG. 1 is a diagram illustrating an exemplary wireless communication system comprising portable data storage with integrated 60 GHz radio, in accordance with an embodiment of the invention.

FIG. 1 is a diagram illustrating an exemplary wireless communication system comprising portable data storage with integrated 60 GHz radio, in accordance with an embodiment of the invention. Referring to FIG. 1, there is shown an access point 112b, a computer 110a, a portable storage 114a, a router 130, the Internet 132 and a web server 134. The computer or host device 110a may comprise a wireless radio 111a, a short-range radio 111b, a host processor 111c, and a host memory 111d. There is also shown a wireless connection between the wireless radio 111a and the access point 112b, and a short-range wireless connection between the short-range radio 111b and the portable storage 114a.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more mobile communication standard, for example, GSM, UMTS, or CDMA2000. The short range radio 111b may comprise suitable logic, circuitry and/or code that may enable communications over radio frequencies with one or more other communication devices, for example the portable storage 114a. The short range radio 111b and/or the portable storage 114a may be compliant with a wireless industry standard, for example Bluetooth, or IEEE 802.11 Wireless LAN. The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a. The router 130 may comprise suitable logic, circuitry and/or code that may be enabled to communicate with communication devices that may be communicatively coupled to it, for example access point 112b or the Internet 132. The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it, for example the Internet 132.

Frequently, computing and communication devices may comprise hardware and software that may enable communication using multiple wireless communication standards and/or protocols. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

It may further be desirable for the user of the computer 110a to access data from the portable storage 114a. Accordingly, the user of the computer 110a may establish a short-range wireless connection with the portable storage 114a. When the short-range wireless connection is established, and with suitable configurations on the computer 110a enabled, data may be transferred from/to the portable storage 114a. In some instances, the data link between the portable storage 114a and the computer 110a may be enabled for high data rates and may comprise, for example, 60 GHz communications technology.

Figure 2A:
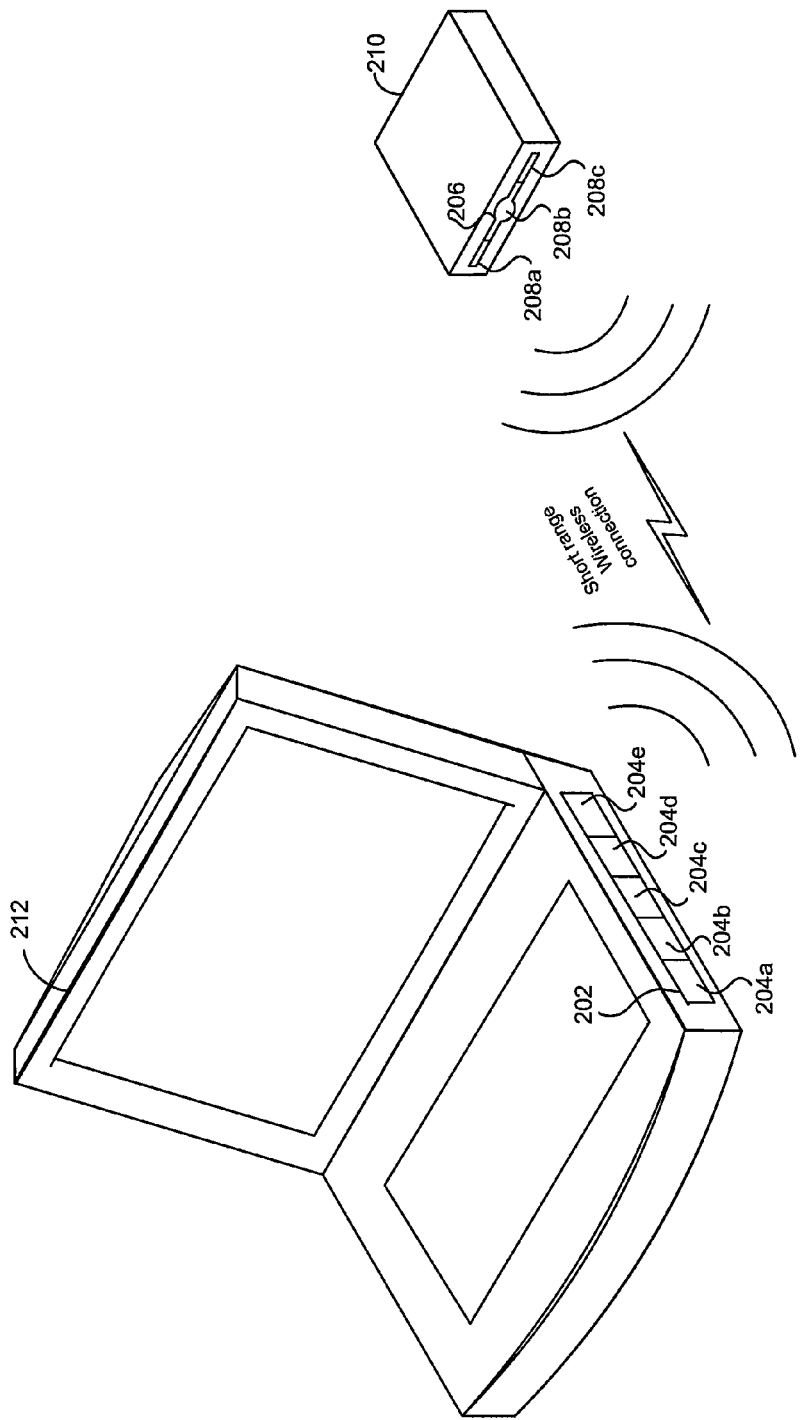
FIG. 2A is a diagram illustrating an exemplary high-rate wireless data link, in accordance with an embodiment of the invention.

FIG. 2A is a diagram illustrating an exemplary high-rate wireless data link, in accordance with an embodiment of the invention. Referring to FIG. 2A, there is shown a computer 212 and a portable storage 210.

The computer 212 may comprise an antenna array 202, comprising one or more antennas, of which antennas 204a, 204b, 204c, 204d, and 204e may be illustrated. The computer 212 may be substantially similar to the computer 110a, for example. The computer 212 may be, for example, a laptop, a personal computer, a mobile telephone, a Personal Digital Assistant (PDA), a set-top box, a multi-media device, or any other device that may require short-range data transfer. Hence, the computer 212 may comprise suitable logic, circuitry and/or code that may be enabled to transmit and receive data via a communication link.

The portable storage 210 may comprise an antenna array 206, comprising one or more antennas, of which antennas 208a, 208b and 208c may be illustrated. The portable storage 210 may be substantially similar to the portable data storage 114a. The portable storage 210 may be, for example, a laptop, a personal computer, a mobile telephone, a Personal Digital Assistant (PDA), a set-top box, a multi-media device, or any other device that may require short-range data transfer and that may store data in its memory. Hence, the portable storage 210 may comprise suitable logic, circuitry and/or code that may be enabled to transmit and receive data via a communication link. In various exemplary embodiments of the invention, the casing of the portable storage 210a may be constructed from a suitable material that may be permeable by radio waves at desirable frequencies, for example at 60 GHz.

The 60 GHz communication links may be particularly suitable for short-range communications between a computer 212 and a portable storage 210 because they may permit very high data transfer rates, due to the large available bandwidth for communications. In addition, 60 GHz communications may be enabled using antennas of small physical dimensions, which may be placed on the casing of the communicating devices, for example the computer 212 and/or the portable storage 210. In accordance with an embodiment of the invention, the communication link may be established by the computer 212 or the portable storage 210. The computer 212 and the portable storage 210 may comprise suitable logic, circuitry and/or code that may be enabled to dynamically and/or automatically setup and configure a desirable communications link. For example, antenna array 206 on the portable storage 210, and the antenna array 202 on the computer 212 may be enabled to automatically steer the transmission/reception beam in a direction that may maximize the signal quality and hence the data rates that may be achievable. Because of the high operating frequency at 60 GHz, path loss may be significant even over short transmission distances. Hence, in some instances, it may be desirable to use the antenna array 202 to generate, for example, a signal beam. A signal beam may increase the directivity of the transmitted and/or received signal in a desirable direction and may focus the signal energy, thus providing increased signal power in certain directions and improved Signal-to-Interference-plus-Noise-Ratio (SINR). In some instances, however, the computer 212 and the portable storage 210 may not be able to initially exchange communications or may be restricted to low data rates because their respective antenna arrays may not be steered toward each other. In these instances, it may be desirable that the antenna array 202 of the computer 212 and/or the antenna array 206 of the portable storage 210 may adjust their beam pattern to enhance the signal quality for data exchange. The beam forming pattern at the antenna array 202 and/or 206, for example, may be adjusted by phase-shifting and weighing the signals that may be fed to the antenna elements, for example 204a, ... , 204e and/or 208a, ... , 208c.

Figure 2B:
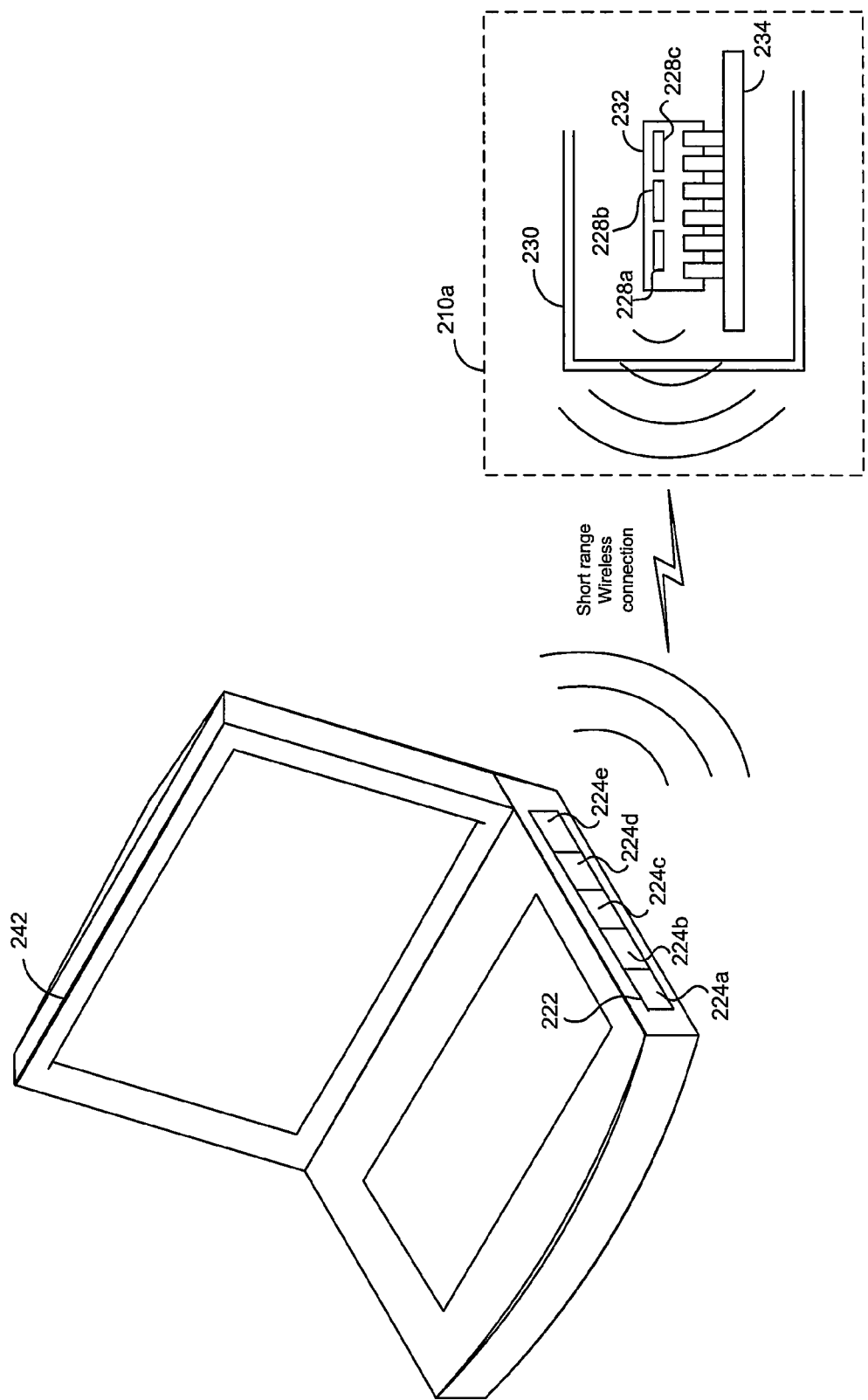
FIG. 2B is a diagram illustrating an exemplary high-rate wireless data link with a chip-based antenna array, in accordance with an embodiment of the invention.

FIG. 2B is a diagram illustrating an exemplary high-rate wireless data link with a chip-based antenna array, in accordance with an embodiment of the invention. Referring to FIG. 2B, there is shown a computer 242 comprising an antenna array 222. There is also shown a portable storage 210a. The portable storage 210a may comprise a casing 230, one or more printed circuit boards (PCBs) 234, and one or more integrated circuits (ICs), of which IC 232 may be illustrated. The IC 232 may comprise one or more antennas, of which antennas 228a, 228b and 228c may be illustrated.

The antenna array 222 may comprise one or more antennas, of which antennas 224a, 224b, 224c, 224d, and 224e may be illustrated.

The computer 242, the antenna array 222, and the antennas 224a through 224e may be substantially similar to the computer 212, the antenna array 202, and the antennas 204a through 204e, respectively. The computer 242 and the portable storage 210a may comprise suitable logic, circuitry and/or code that may be enabled to dynamically and/or automatically setup and configure a desirable communications link. For example, the antenna array comprising antennas 228a, 228b, and 228c, for example, on the portable storage 210a, and the antenna array 222 on the computer 242 may be enabled to automatically steer the transmission/reception beam in a direction that may optimize the signal quality and hence the data rates that may be achievable, as described for FIG. 2A.

The casing 230 of the portable storage 210a may be constructed from a suitable material, for example, that may be permeable by radio waves at desirable frequencies, for example at 60 GHz. The IC 232 may comprise suitable logic, circuitry and/or code that may be enabled to generate and/or process radio frequency signals for reception and/or transmission via the one or more antennas, of which antennas 228a, 228b and 228c may be illustrated.

The antennas 228a, 228b, and 228c may be used together to form an antenna array, similar to antenna array 206. The antennas 228a, 228b and 228c may be implemented on the package of the IC 232 and/or directly on the IC 232.

Similar to FIG. 2A, in accordance with an embodiment of the invention, the communication link may be established by the computer 242 or the portable storage 210a.

In some instances, it may be desirable to not use beamforming initially, to setup communications between the computer 242 and the portable storage 210a. This may be the case when the narrow beams that may be generated by the antenna arrays of the portable storage 210a and the computer 242 may make it difficult to discover a communicating device. In these instances, it may be desirable to initially receive and transmit as omni-directionally as may be feasible. In accordance with another embodiment of the invention, the portable storage 210a and/or the computer 242 may use an alternative radio technology to aid initial communications setup. For example, Bluetooth may be used to initialize communications and setup basic parameters, which may then be used to set up high-rate data transfer via, for example, a 60 GHZ communication link using the antenna arrays, as described above.

Figure 3:
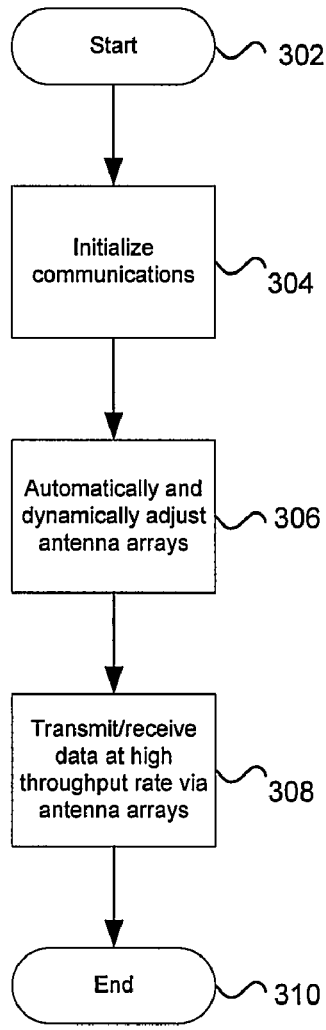
FIG. 3 is a flowchart illustrating an exemplary multi-frequency antennas system, in accordance with an embodiment of the invention.

FIG. 3 is a flow chart illustrating an exemplary communication setup, in accordance with an embodiment of the invention, in accordance with an embodiment of the invention. The communication setup process may be initialized in step 302. In step 304, the initial communications setup may be established, for example between the computer 212 and the portable storage 210. In accordance with various embodiments of the invention, the initialization of the communication may be achieved via an alternative link, for example Bluetooth, or over a 60 GHz link, as described for FIG. 2A and FIG. 2B. In some instances, it may be desirable not to use beamforming in step 304 to simplify the connection setup, as described in FIG. 2B, because more omni-directional antenna characteristics may be advantageous. In step 306, after the connection has been established, the 60 GHz antenna arrays may automatically and/or dynamically adjust their beam patterns in order to optimize some communication performance parameters. For example, the beams may be adjusted in order to optimize signal strength, Signal-to-Interference-and-Noise-Ratio (SINR), or bit error rate (BER). The beam patterns and parameters may be adjusted, for example through transmitted and received training data. In step 308, the transmission and reception of the data through the antenna arrays may take place. In some cases, for example in the case of non-stationary transceivers, the beam may be dynamically adjusted during the data transmission.

In accordance with an embodiment of the invention, a method and system for portable data storage with integrated 60 GHz radio may comprise establishing a microwave communication link between a wireless portable storage device, for example portable storage 210, and a wireless transmitter and/or wireless receiver, for example computer 212. Beamforming parameters of a first antenna array, for example antenna array 206, coupled to said wireless portable storage device 210 and a second antenna array 202 coupled to said wireless transmitter and/or wireless receiver, for example computer 212 may be adjusted automatically and/or dynamically. The wireless portable storage 210 and the wireless transmitter and/or wireless receiver, for example computer 212 may exchange data via said first antenna array 206 and said second antenna array 202.

A secondary wireless communication link may be established to initialize the establishing of the microwave communication link, as described for FIG. 2A and FIG. 2B. The secondary wireless communication link may be established via Bluetooth protocol. The wireless portable storage, for example the portable storage 210a, and the wireless transmitter and/or wireless receiver, for example the computer 242, may receive and transmit in the 60 GHz frequency band. The first antenna array, for example the antenna array comprising antennas 228a, 228b, and 228c, and/or the second antenna array may be located on a casing, within an integrated circuit package, or within an integrated circuit of said wireless portable storage, as illustrated in FIG. 2B. The wireless portable storage and/or the wireless transmitter and/or receiver may be located within a laptop, a personal computer, a mobile telephone, a Personal Digital Assistant (PDA), a set-top box, and a multi-media device. The first antenna array and the second antenna array may comprise one or more antennas, and the beamforming parameters may be adjusted to optimize a communication link performance metric, as shown in FIG. 2A and FIG. 2B.

Another embodiment of the invention may provide a machine-readable storage, having stored thereon, a computer program having at least one code section executable by a machine, thereby causing the machine to perform the steps as described above for a method and system for portable data storage with integrated 60 GHz radio.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   establishing a wireless communication link between a wireless portable storage device and a wireless communication device;
   communicating, via the wireless communication link, one or more parameters between the wireless portable storage device and the wireless communication device to set up a microwave communication link between a first antenna array of the wireless portable storage device and a second antenna array of the wireless communication device, wherein at least one protocol utilized for the wireless communication link is different than at least one protocol utilized for the microwave communication link;
   adjusting beamforming parameters of the first antenna array, thereby steering the first antenna array toward the second antenna array; and
   exchanging data between the wireless portable storage device and the wireless communication device via the microwave communication link between the first antenna array and the second antenna array, wherein the second antenna array is steered toward the first antenna array if the data rate of the exchanged data is low.

2. The method according to claim 1, wherein the at least one protocol utilized for the wireless communication link comprises one or more IEEE 802.11 protocols.

3. The method according to claim 1, wherein the at least one protocol utilized for the second wireless communication link comprises Bluetooth protocol.

4. The method according to claim 1, wherein the microwave communication link is within the 60 GHz frequency band.

5. The method according to claim 1, wherein the first antenna array is located within a package of a single integrated circuit of the wireless portable storage device, or within a single integrated circuit of the wireless portable storage device.

6. The method according to claim 1, wherein the wireless portable storage device is located within a laptop, a personal computer, a mobile telephone, a Personal Digital Assistant (PDA), a set-top box, and a multi-media device.

7. The method according to claim 1, wherein the wireless communication device is located within a laptop, a personal computer, a mobile telephone, a Personal Digital Assistant (PDA), a set-top box, and a multi-media device.

8. The method according to claim 1, wherein the first antenna array and the second antenna array comprise one or more antennas.

9. The method according to claim 1, comprising adjusting the beamforming parameters to optimize a communication link performance metric.

10. A system for processing communication signals, the system comprising:
    one or more circuits for use in a wireless portable storage device, the one or more circuits are operable to:
    establish a wireless communication link between the wireless portable storage device and a wireless communication device;
    communicate, via the wireless communication link, one or more parameters to between the wireless portable storage device and the wireless communication device to set up a microwave communication link between a first antenna array of the wireless portable storage device and a second antenna array of the wireless communication device transmitter and/or wireless receiver, wherein at least one protocol utilized for the wireless communication link is different than at least one protocol utilized for the microwave communication link;
    adjust beamforming parameters of the first antenna array, thereby steering the first antenna array toward the second antenna array; and
    exchange data between the wireless portable storage device and the wireless communication device via the microwave communication link between the first antenna array and the second antenna array, wherein the second antenna array is steered toward the first antenna array if the data rate of the exchanged data is low.

11. The system according to claim 10, wherein the at least one protocol utilized for the first wireless communication link comprises one or more IEEE 802.11 protocols.

12. The system according to claim 10, wherein said the protocols utilized for the second wireless communication link comprises Bluetooth protocol.

13. The system according to claim 10, wherein the microwave communication link is within the 60 GHz frequency band.

14. The system according to claim 10, wherein the first antenna array is located within a package of a single integrated circuit of the wireless portable storage device, or within a single integrated circuit of the wireless portable storage device.

15. The system according to claim 10, wherein the second antenna array is located within a package of a single integrated circuit, or within a single integrated circuit of the wireless communication device.

16. The system according to claim 10, wherein the wireless portable storage device is located within a laptop, a personal computer, a mobile telephone, a Personal Digital Assistant (PDA), a set-top box, and a multi-media device.

17. The system according to claim 10, wherein the wireless communication device is located within a laptop, a personal computer, a mobile telephone, a Personal Digital Assistant (PDA), a set-top box, and a multi-media device.

18. The system according to claim 10, wherein the first antenna array and the second antenna array comprise one or more antennas.

19. The system according to claim 10, wherein the one or more circuits adjust the beamforming parameters to optimize a communication link performance metric.

20. A wireless portable storage device for wireless communication, the portable storage device comprising:
    a first antenna array;
    one or more circuits operable to:
    communicate one or more parameters over a wireless link using a first protocol to set up a microwave communication link between the first antenna array and a second antenna array of a wireless communication device;
    steer the first antenna array toward the second antenna array; and
    exchange data over the microwave communication link using a second protocol that is different than the first protocol, wherein the second antenna array is steered toward the first antenna array if the data rate of the exchanged data is low.

* * * * *